(12) United States Patent
Swenson et al.

(10) Patent No.: US 8,427,108 B2
(45) Date of Patent: Apr. 23, 2013

(54) METHOD FOR CONTROLLING AN ELECTRIC ACCUMULATOR UNIT

(75) Inventors: Josh C. Swenson, Rockford, IL (US); Vietson M. Nguyen, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 342 days.

(21) Appl. No.: 12/859,368

(22) Filed: Aug. 19, 2010

(65) Prior Publication Data

US 2012/0043938 A1 Feb. 23, 2012

(51) Int. Cl.
*H02J 7/00* (2006.01)
*H02J 9/06* (2006.01)
*H01M 10/44* (2006.01)

(52) U.S. Cl.
USPC .............................. 320/128; 320/166; 307/48

(58) Field of Classification Search .................. 320/128, 320/166; 307/48
See application file for complete search history.

(56) References Cited

U.S. PATENT DOCUMENTS

| | | | |
|---|---|---|---|
| 6,142,418 A | 11/2000 | Weber et al. | |
| 6,182,435 B1 | 2/2001 | Niggemann et al. | |
| 6,316,841 B1 | 11/2001 | Weber | |
| 7,094,496 B2 | 8/2006 | Rodriguez et al. | |
| 7,367,193 B1 | 5/2008 | Thompson | |
| 7,383,903 B2 | 6/2008 | Varenne | |
| 7,555,893 B2 | 7/2009 | Okai et al. | |
| 7,566,981 B2 | 7/2009 | Kunkel et al. | |
| 7,568,958 B2 | 8/2009 | Vigier | |
| 7,634,911 B2 | 12/2009 | Brinkman | |
| 2011/0031931 A1* | 2/2011 | Rembach et al. | ............. 320/128 |
| 2011/0031939 A1* | 2/2011 | Funaba et al. | ................. 320/166 |

OTHER PUBLICATIONS

U.S. Appl. No. 12/859,353, filed Aug. 19, 2010, "Active Filtering Electrical Accumulator Unit."
U.S. Appl. No. 12/859,386, filed Aug. 19, 2010, "Modular Electrical Accumulator Unit."
U.S. Appl. No. 12/859,928, filed Aug. 20, 2010, "A Method and Apparatus for Average Current Control of an Electrical Accumulator Unit."
U.S. Appl. No. 12/724,691, filed Mar. 16, 2010, "Control Method for Electrical Accumulator Unit".

* cited by examiner

*Primary Examiner* — M'Baye Diao
(74) *Attorney, Agent, or Firm* — Carlson, Gaskey & Olds PC

(57) ABSTRACT

A power system has a generator, a variable load, and an electrical accumulator unit. The electrical accumulator unit stores power when the generator generates excess power, and supplements power from the generator when the generator generates insufficient power.

24 Claims, 3 Drawing Sheets

METHOD FOR CONTROLLING AN ELECTRIC ACCUMULATOR UNIT

BACKGROUND

The present application is directed toward power generation systems, and more particularly toward a power generation system using an electrical accumulator unit.

In order to provide power to electrical systems many vehicles, such as military aircraft, feature an on-board generator which converts rotational movement within the engines to electrical power using known power generation techniques. The generated electrical power is used to power on-board electrical components such as flight controls, sensors, or weapons controls. During standard operations, such a system will have an electrical load which normally draws power at a certain level. When some on-board electrical systems are activated a temporary elevated load spike can occur.

In order to compensate for the temporary load spike, a generator that is rated at least as high as the highest anticipated power spike is typically used. This ensures that adequate power can be provided to the on-board electrical systems at all times, including during elevated load spikes. In a typical power generation system, the physical size of the generator is directly related to the power rating of the generator. The use of a higher rated generator to account for high load spikes results in a heavier generator.

SUMMARY

A power generation system having a generator, a controller coupled to the generator such that the controller can control a power output of the generator, a power bus connected to the generator such that the power bus receives electrical power from the generator, and an electrical accumulator unit connected to the power bus such that the electrical accumulator unit is capable of storing power from the power bus and providing power to the power bus is disclosed. The electrical accumulator unit has an independent electrical accumulator unit controller.

Also disclosed is a method for operating a power system. The method includes the steps of: generating power with a generator; converting the power into DC power format; providing the DC power to a DC power bus; detecting a power characteristic on the DC power bus using a sensor; and operating a connected electrical accumulator unit in one of a plurality of modes, where the mode is determined at least in part based on the detected power characteristic.

These and other features of the present invention can be best understood from the following specification and drawings, the following of which is a brief description.

DETAILED DESCRIPTION

Figure 1:
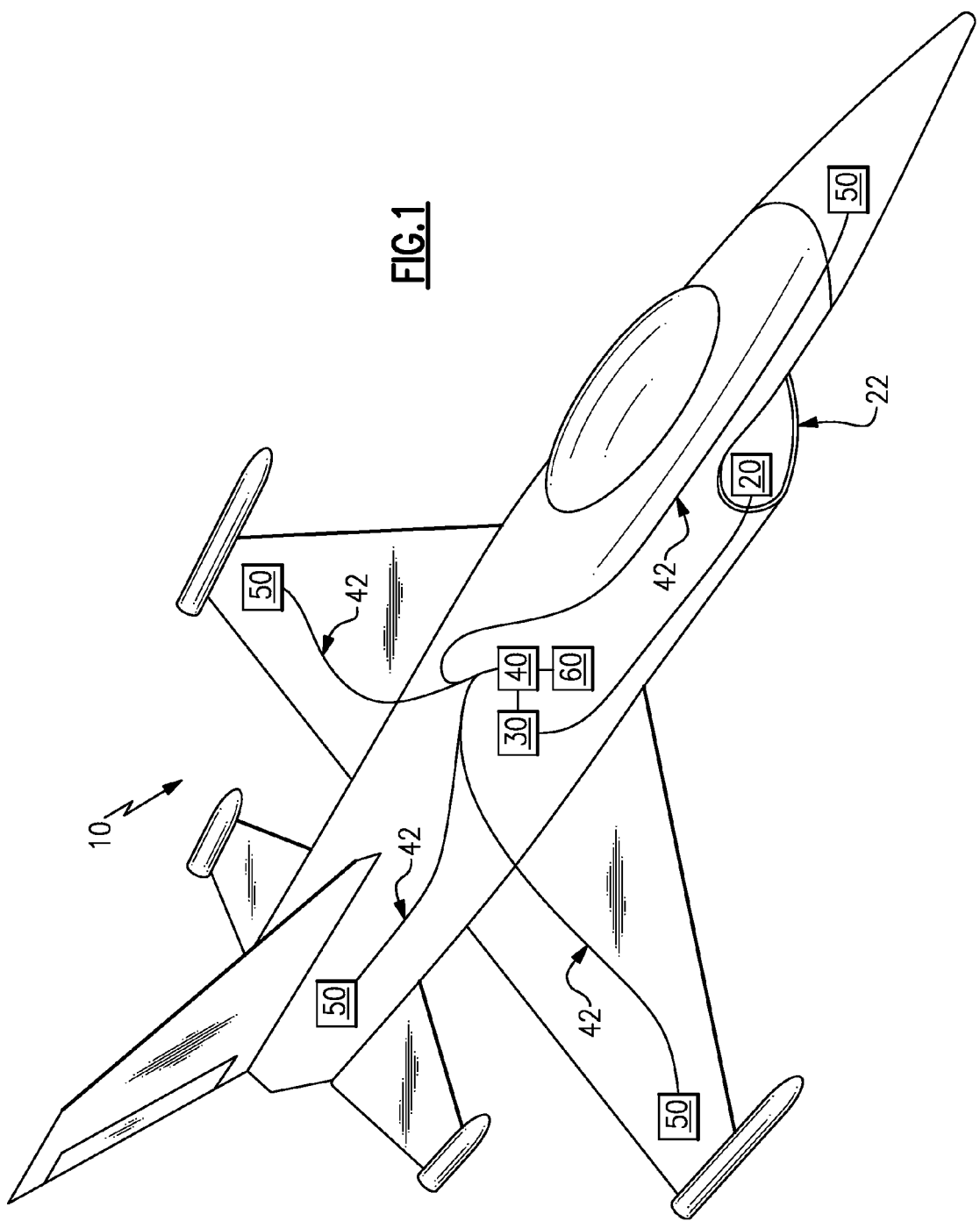
FIG. 1 illustrates a sample aircraft having an on-board power generation system.

FIG. 1 schematically illustrates a sample aircraft 10 having an on-board power generation system. A generator 20 converts rotational motion within an engine 22 into electrical power using known power generation techniques. The generator 20 is electrically coupled to a rectifier 30. The rectifier 30 converts the power generated in the generator 20 (typically three-phase power) into a form usable by on-board electronics 50 (typically DC power). The rectifier 30 is electrically coupled to a power bus 40 which supplies power to the on-board electronics 50 through power supply lines 42. Additionally connected to the power bus 40, is an electrical accumulator unit 60, which can store excess power generated by the generator 20 when the load created by the on-board electronics 50 is low, and reinsert that power into the power system when the load created by the on-board electronics 50 undergoes a high load spike.

Figure 2:
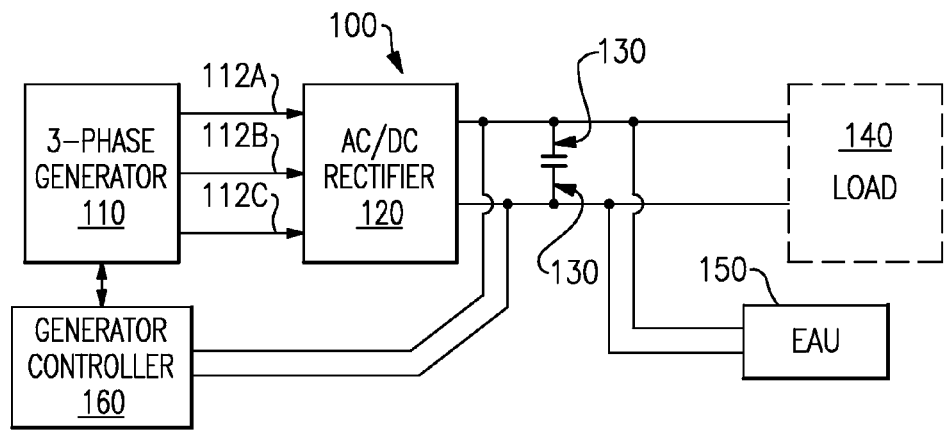
FIG. 2 illustrates an aircraft power generation system including an electrical accumulator unit.

FIG. 2 schematically illustrates a power generation system 100 described with regards to FIG. 1. A three phase generator 110 is connected to an AC/DC rectifier 120 via three phase outputs 112A, 112B, 112C. The three phase generator 110 may also be referred to as generator 110. The AC/DC rectifier 120 converts the generated three phase power into DC power, and outputs the DC power to a power bus 130. Connected to the DC power bus 130 is a variable load 140. The variable load 140 (also referred to as an external load) may represent a variable number and size of electrical loads that can change over time and/or be selectively added, removed, or modified. Additionally connected to the DC power bus 130 is an electrical accumulator unit 150. The three phase generator 110, AC/DC rectifier 120, DC power bus 130, variable load 140, and electrical accumulator unit 150 represent embodiments of the generator 20, rectifier 30, power bus 40, the load created by the on-board electronics 50, and electrical accumulator unit 60 of FIG. 1 respectively.

A generator controller 160 (also referred to as controller 160) is connected to the three phase generator 110, and provides control signals for controlling the generator. The generator controller 160 is also connected to the output of the AC/DC rectifier 120 via power sensors, and is capable of detecting the power output of the AC/DC rectifier 120 and the power demands of the variable load 140. The electrical accumulator unit 150 includes an independent controller (illustrated in FIG. 3), which allows the electrical accumulator unit 150 to store and insert power independent of the functions of the generator controller 160.

Figure 3:
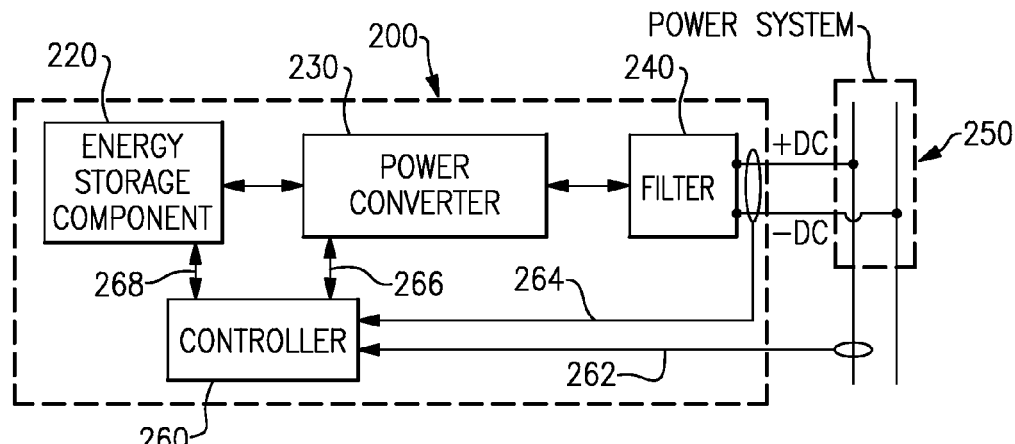
FIG. 3 schematically illustrates an example electrical accumulator unit.

FIG. 3 illustrates a schematic diagram of an example electrical accumulator unit 200. The electrical accumulator unit 200 and power bus 250 represent embodiments of the electrical accumulator unit 150 and DC power bus 130 of FIG. 2. The electrical accumulator unit 200 has four primary components, an energy storage unit 220, a power converter 230, a filter 240, and a controller 260. The filter 240 is a combination of a ripple filter and an electromagnetic interference (EMI) filter. The ripple filter portion of the filter 240 removes ripple currents, which have leaked onto the power bus 250 due to the presence of power electronics in the load, such as variable load 140 of FIG. 2, or due to the action of the power converter 230. Similarly, the EMI filter portion of the filter 240 filters out electromagnetic interference present on the power bus 250. Ripple currents and electromagnetic interference are common occurrences in electrical systems and result from the connection the power bus 250 has to the variable load as well as the electrical systems exposure to outside sources of electrical noise. Allowing the interference and ripple currents to reach the power converter 230 is undesirable.

After passing through the filter 240, the electrical power enters a bi-directional power converter 230 where it is converted from the form of electrical power used by the power bus 250 into a form which can be accepted and stored by the energy storage component 220. The bi-directional power converter 230 is also capable of converting power output from the energy storage component 220 into the form used on the power bus 250 when the electrical accumulator unit 200 is providing power to the system, such as during a high load spike or while operating in load-leveling source mode.

The energy storage component 220 can be any device or component which is capable of accepting power from the power converter 230 and storing that power for later use. In the illustrated example of FIG. 3, a battery or ultra capacitor (ultra cap) could be used. However, other energy storage components could be used with minor modifications to the electrical accumulator unit 200.

The controller 260 can be any type of controller capable of controlling the operational modes of the electrical accumulator unit 200. By way of example, the controller 260 could be a digital signal processor (DSP) or a microcontroller. The controller 260 allows the electrical accumulator unit 200 to have a load-leveling source mode, a load-leveling sink mode, a maintenance mode, and a stand-by mode. The controller 260 is connected to a current sensor 262, which detects the current on the DC power bus 250, and to a voltage sensor 264, which detects the voltage level of the DC power bus 250. The controller 260 further detects power converter 230 conditions via a control signal input 266 and energy storage component 220 conditions via a control input 268.

Figure 4:
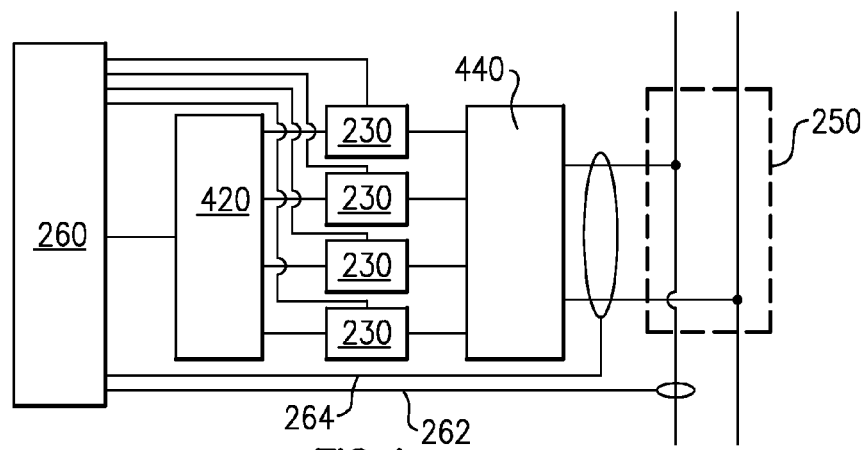
FIG. 4 schematically illustrates another example electrical accumulator unit.

An alternate configuration of the electrical accumulator unit 200 is illustrated in FIG. 4. The example of FIG. 4 includes multiple converters 230, each connecting a filter 440 to an energy storage component 430. A controller 260 is controllably connected to each of the converters 230, and operates them in conjunction to provide power to the energy storage component 430. To operate the converters 230 in conjunction, the controller 260 can use a staggered (i.e. phase shifted) control schedule, according to methods known in the art. Operation of multiple converters 230 with a single filter 440 allows the physical size of the filter 440 to be reduced relative to the size of the filter 240 in the example of FIG. 3. Although four converters 230 are illustrated in FIG. 4, alternate configurations having a different number of converters 230 could be used.

Figure 5:
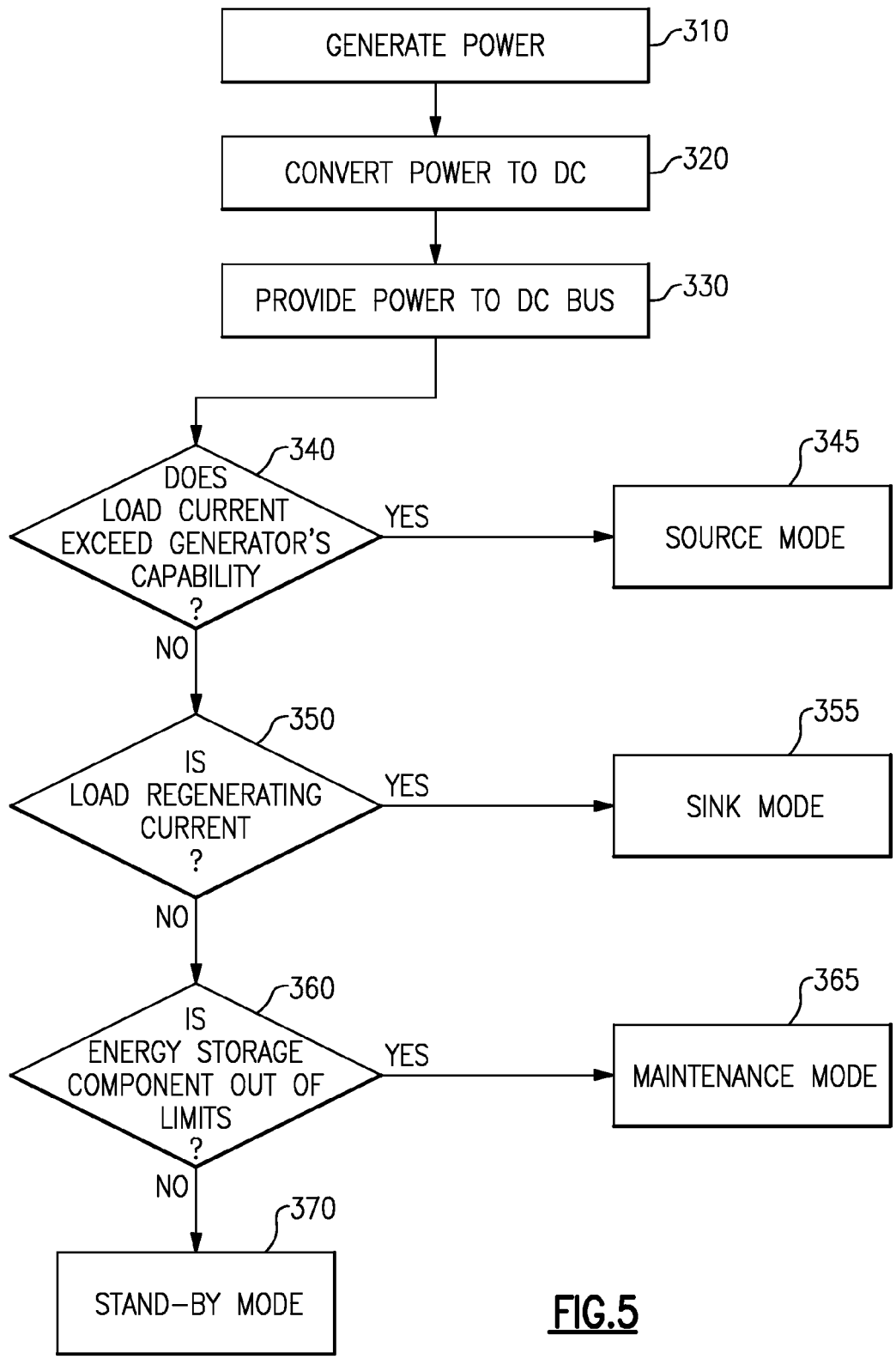
FIG. 5 illustrates a flowchart of an example method for operating an electrical accumulator unit.

Illustrated in FIG. 5 is a method by which the controller 260 controls the electrical accumulator unit 250. Initially, the power system generates power in the "generate power" step 310, converts the power to DC in the "convert power to DC" step 320, and provides the power to the DC power bus 250 in the "provide power to DC bus" step 330. After the "provide power to DC bus" step 330, the controller 260 performs a series of three checks 340, 350, 360 to determine what mode to operate the electrical accumulator unit 200 in. When the current sensor 262 detects a current above a preset threshold, the controller places the electrical accumulator unit 200 into a load-leveling source mode 345. Typically, the threshold is determined to be a current slightly below the generator 110 maximum output current. A current above this threshold indicates that the load is beginning to exceed the generational capabilities of the generator 110. While in load-leveling source mode 345, the electrical accumulator unit 200 outputs power to the DC power bus 250 equal to the difference between the required load current and the current being output by the generator 110. While operating in source mode 345, the electrical accumulator unit 200 is a low-bandwidth source, and voltage regulation is provided by the generator 110.

When the current sensor 262 detects that the current flow has reversed direction, the controller 260 places the electrical accumulator unit 200 into a load-balancing sink mode 355.

The DC power bus current reversing directions indicates that the load has begun generating power, rather than using power. While in sink mode 355, excess energy is siphoned off of the DC power bus 250 and stored within the energy storage component 220. While operating in sink mode 355, the electrical accumulator unit 200 additionally operates as a voltage regulator, thereby maintaining the power bus voltage while the generator 110 is not providing power. Operating in sink mode 355 allows the electrical accumulator unit 200 to store power for later operations in the source mode 345.

When the current sensor 262 detects that the current is neither exceeding the threshold, nor flowing in reverse, the controller 260 detects a charge level of the energy storage component 220. If the energy storage component 220 has become either overcharged or undercharged, the controller 260 places the electrical accumulator unit 200 into a maintenance mode 365. While in maintenance mode 365, the electrical accumulator unit 200 operates as either a constant current source (when the energy storage component 220 is overcharged) or a constant current sink (when the energy storage component 220 is undercharged). The currents produced or drawn by the electrical accumulator unit 200 while in maintenance mode are significantly below the generator's 110 output capability, thereby allowing the generator 110 to operate as the voltage regulator for the DC power bus 250.

When the controller 260 senses that the current is neither back-flowing, nor exceeding the threshold, and the energy storage component 220 is properly charged, the controller 260 places the electrical accumulator unit 200 in a stand-by mode 370. In the stand-by mode 370, the electrical accumulator unit 200 does not draw power from, or provide power to the DC power bus 250, and the generator 110 operates as the voltage regulator for the DC power bus 250.

Although an example embodiment has been disclosed, a worker of ordinary skill in this art would recognize that certain modifications would come within the scope of this invention. For that reason, the following claims should be studied to determine the true scope and content of this invention.

What is claimed is:

1. A power generation system comprising:
   a generator;
   a controller coupled to said generator such that said controller can control a power output of said generator;
   a power bus connected to said generator such that said power bus receives electrical power from said generator; and
   an electrical accumulator unit connected to said power bus such that said electrical accumulator unit is capable of storing power from said power bus and providing power to said power bus, said electrical accumulator unit further comprising an independent electrical accumulator unit controller, wherein said independent electrical accumulator unit controller comprises at least a first load-balancing sink mode and a second load-balancing source mode.

2. The power generation system of claim 1, wherein said independent electrical accumulator unit controller further comprises a power bus current sensor input.

3. The power generation system of claim 1, wherein said independent electrical accumulator unit controller further comprises a power bus voltage sensor input.

4. The power generation system of claim 1, wherein said independent electrical accumulator unit controller further comprises a maintenance mode.

5. The power generation system of claim 1, wherein said independent electrical accumulator unit controller further comprises a stand-by mode.

6. The power generation system of claim 1, wherein said independent electrical accumulator unit controller comprises a microcontroller.

7. The power generation system of claim 1, wherein said independent electrical accumulator unit controller comprises a digital signal processor.

8. The power generation system of claim 1, wherein said electrical accumulator unit is a low bandwidth source while in a load balancing source mode.

9. The power generation system of claim 1, wherein said electrical accumulator unit is a power bus voltage regulator while in said load balancing sink mode.

10. The power generation system of claim 1, wherein said generator is a voltage regulator while said electrical accumulator unit is in a load balancing source mode.

11. The power generation system of claim 1, wherein said controller is configured to cause excess energy generated by said load to be stored within the electrical accumulator unit during said load balancing sink mode.

12. A method for operating a power system comprising the steps of:
converting power from a generator into DC power format;
providing said DC power to a power bus;
detecting a power characteristic on said power bus using a sensor;
operating a connected electrical accumulator unit in at least one of a load-balancing sink mode, a load-balancing source mode, a maintenance mode and a stand-by mode, wherein said mode is determined at least in part based on said detected power characteristic;
placing said electrical accumulator unit in a load balancing sink mode when said detected power characteristic exceeds a first threshold;
operating said electrical accumulator unit as a power bus voltage regulator while in said load balancing sink mode; and
controlling said connected electrical accumulator unit using an independent electrical accumulator unit controller.

13. The method of claim 12, wherein said detected power characteristic is a power bus current.

14. The method of claim 13, further comprising the step of providing stored power to said power bus when said detected power characteristic is flowing in a reverse direction.

15. The method of claim 14, wherein said power characteristic flowing in a reverse direction comprises a regenerative current.

16. The method of claim 13, further comprising the step of detecting a charge status of an energy storage component when said power bus current is below a threshold and said detected power characteristic is not flowing in a reverse direction.

17. The method of claim 16, further comprising the step of outputting a low level constant current from said electrical accumulator unit to said power bus when said energy storage component charge exceeds an overcharge threshold.

18. The method of claim 16, further comprising the step of said electrical accumulator unit drawing a constant current input from said power bus when said energy storage component charge is below an undercharge threshold.

19. The method of claim 16, further comprising the step of placing said electrical accumulator unit in a standby mode when said energy storage component charge is between an undercharge threshold and an overcharge threshold.

20. The method of claim 16, further comprising the step of operating said generator as a power bus voltage regulator when said detected power characteristic is below a threshold and said detected power bus characteristic is not flowing in a reverse direction.

21. The method of claim 12, further comprising the step of accepting and storing power from said power bus in said electrical accumulator unit when said detected power characteristic exceeds a threshold.

22. The method of claim 21, further comprising the step of operating said generator as a power bus voltage regulator when said detected power characteristic exceeds the threshold.

23. The method of claim 22, wherein said step of placing said electrical accumulator unit in a load balancing sink mode when said detected power characteristic exceeds a first threshold occurs when said detected power characteristic is flowing in a reverse direction.

24. The method of claim 12, further comprising the step of placing said electrical accumulator unit in said load balancing source mode when said detected power characteristic falls below a second threshold.

* * * * *